UNITED STATES PATENT OFFICE.

FRITZ BLAU, OF CHARLOTTENBURG, GERMANY, ASSIGNOR TO GENERAL ELECTRIC COMPANY, A CORPORATION OF NEW YORK.

MANUFACTURE OF INCANDESCENT LAMPS.

1,269,520.  Specification of Letters Patent.  Patented June 11, 1918.

No Drawing.   Application filed April 18, 1916.  Serial No. 91,961.

*To all whom it may concern:*

Be it known that I, FRITZ BLAU, a citizen of the Empire of Austria-Hungary, residing at Charlottenburg, Germany, have invented certain new and useful Improvements in the Manufacture of Incandescent Lamps, of which the following is a specification.

My invention relates to incandescent lamps, particularly lamps with metal filaments, and its object is to provide in the lamp a very efficient drying agent which will remove or render harmless the water vapor in the lamp, and thereby produce an improved lamp.

It has been proposed that special means be employed in order to remove from incandescent lamps during the process of manufacture not only the residual gas but also the residual moisture. To this end the lamps are usually heated while being evacuated, and it has also been proposed to introduce some kind of drying agent into the lamp. Many of the drying agents now known are, however, subject to the disadvantage that they absorb moisture before they are introduced into the lamps, and consequently have lost a great deal of their efficiency by the time they are put into the lamp. Under some conditions, the drying agent absorbs so much moisture during the process of manufacture and prior to the exhaustion of the lamp that the drying agent cannot fulfil its purpose, and in some cases even gives up in the lamp some of the moisture which it has previously absorbed, thereby producing the opposite effect from that which is intended. One drying agent, phosphorous pentoxid, which has been proposed has in addition the further disadvantage that it is volatile and consequently requires elaborate precautions in use.

In accordance with my invention, these disadvantages are avoided and a superior lamp is obtained by introducing into the lamp metallic compounds which after the lamp has been heated during manufacture may be transformed into very effective drying agents by chemical decomposition. Thus I introduce into the lamp metallic compounds which in the beginning are not suitable as drying agents but which under the influence of heat, either that employed in the manufacture of the lamp or heat especially applied for the purpose, undergo a profound chemical change or decomposition which produces in the lamp a very efficient drying agent. For example, it is known that the anhydrous oxids of the alkali metals and of the alkaline earth metals, especially of barium, are very efficient drying agents. This is also true of the corresponding metals themselves. If one should attempt to use these substances in the usual manner the above mentioned disadvantages would be encountered, but this is not true if they are used in accordance with my invention. If, for example, barium oxid is to be used as a drying agent in accordance with my invention, a barium compound decomposable by heat is introduced into the incandescent lamp. Among such compounds is barium azoimid, $BaN_6$. This salt may be introduced into the lamp either in a dry condition or in an aqueous solution. In the latter case, the water is removed by evaporation after the salt is in place. If the incandescent lamp is now evacuated, and heated to the proper temperature, the barium azoimid decomposes with the evolution of nitrogen and leaves in the lamp a deposit of metallic barium. If the heating is then further continued and an oxidizing medium or oxygen containing gas, such as dry air, is admitted to the lamp, the metallic barium is transformed into barium oxid. In this manner the incandescent lamp after evacuation is provided with the desired drying agent manufactured directly in the lamp.

The procedure may be such that the decomposition of the metallic compound, such as barium azoimid, goes on from the beginning in the presence of air, in which case barium oxid is formed without any perceptible intermediate formation of metallic barium.

If, in the example first described, the introduction of oxidizing gas is omitted, an incandescent lamp is obtained which contains metallic barium as an effective drying agent.

Other salts of hydrazoic acid act like barium azoimid, as for example, the corresponding compounds of the alkalis and of the alkaline earths, but barium azoimid gives very good results, and therefore the use of it has been described as an example of one embodiment of my invention.

What I claim as new and desire to secure by Letters Patent of the United States, is,—

1. The method which consists in introducing into a lamp having a glass envelop a metallic compound decomposable at a temperature above room temperature and below the temperature at which glass softens and producing a drying medium when decomposed, and heating the envelop of the lamp to decompose said compound.

2. The method which consists in introducing into an incandescent lamp a salt of barium and hydrazoic acid, and heating the lamp to decompose said salt.

3. The method which consists in introducing into an incandescent lamp barium azoimid $BaN_6$, and heating the lamp to decompose said barium azoimid.

4. The method which consists in introducing into a lamp a salt of an alkali or alkaline earth metal and hydrazoic acid, which is decomposable to leave a residue of said metal at a temperature between room temperature and the temperature at which glass softens, heating the lamp to decompose said salt, and oxidizing the metallic residue to form a drying agent.

5. The method which consists in introducing into an incandescent lamp a metallic salt decomposable at a temperature between room temperature and the temperature at which glass softens and leaving a metallic residue in the lamp when decomposed, and heating the glass of the lamp to produce decomposition of said salt.

6. An incandescent lamp comprising a sealed envelop, a filament therein, and metallic barium on the interior surface of said envelop.

7. An incandescent lamp having a sealed envelop, a filament therein, and anhydrous oxid of barium in said envelop.

In witness whereof, I have hereunto set my hand this thirteenth day of March, 1916.

FRITZ BLAU.

Witnesses:
HENRY HASPER,
ALLEN F. JENNINGS.